United States Patent Office 3,000,849
Patented Sept. 19, 1961

3,000,849
LINEAR COPOLYCONDENSATION PRODUCT COMPRISING RECURRING AROMATIC CARBONATE AND CARBOXYLIC ACID ESTER UNITS IN THE POLYMER CHAIN, AND ARTICLE FORMED THEREOF
Margaret Loudon Clachan, Norman Spencer McPherson, Keith Reid Tatchell, and Terence Arnold Abbott, all of Manningtree, England, assignors to Bexford Limited, Manningtree, England, a British company
No Drawing. Filed Jan. 7, 1959, Ser. No. 785,338
Claims priority, application Great Britain Jan. 13, 1958
5 Claims. (Cl. 260—45.4)

This invention relates to polymeric materials and more particularly to a novel class of polymeric materials, their production and their industrial uses.

It is known to produce polycarbonate materials which are capable of being formed into useful self-supporting films and other materials. Such polycarbonates may be obtained by several processes, e.g. by reacting a di-monohydroxy aryl alkane with phosgene, by transesterification of a di-monohydroxy aryl alkane with a dialkyl or diaryl carbonate, or by reaction of equimolar quantities of di-monohydroxy aryl alkanes and their bis-chlorocarbonic esters. These methods are well known per se. Suitable di-monohydroxy aryl alkanes are 4.4′-dihydroxy diphenyl-2:2-propane and the corresponding compounds in which the propane grouping is replaced by methane, ethane, butane or cyclohexane groups. Polycarbonates derived from mixtures of these various alkanes are herein included in the term "polycarbonate."

Polycarbonates obtained, for example, from 4.4′-dihydroxy diphenyl-2:2-propane have properties rendering them of value in the production of self-supporting films, e.g. as the film base support for photographic material. Thus the polycarbonate is soluble in a variety of common solvents, so that it may be cast in film form from solution. Moreover, the material does not crystallise readily so that the film, cast from solvent and unstretched, has clarity and tensile strength comparable with, for example, cellulose acetate film, and is better than that film in respect of low moisture absorption and dimensional stability. Unfortunately, however, the polycarbonate film has a lower Young's modulus than has cellulose triacetate film, which indicates a lower rigidity, and this is a serious disadvantage from the standpoint of producing high quality film base for photographic purposes. Moreover, such polycarbonates present difficulty in injection moulding owing to their high viscosity at the moulding temperature.

It has been suggested that film base, and specifically photographic film base, might be made from a so-called polyester (a condensation product of at least one dibasic acid with at least one glycol containing 2 to 10 carbon atoms), of which polyethylene terephthalate is the usual commercial variety. This material has excellent dimensional stability, but the insolubility and tendency to ready crystallisation of the material make its conversion into film a most difficult and expensive operation, resort being had to a technique of melt-casting followed by quenching to prevent crystallisation and biaxial stretching while hot to promote orientation.

According to the present invention there are provided copolyesters which are copolymers of (I) polycarbonates and (II) polyesters which are condensation products of dibasic acids and glycols containing 2 to 10 carbon atoms, the polyester units being present in the copolymer in random distribution or in random block distribution and constituting 1 to 90%, preferably 3 to 70%, by weight of the copolyester.

A preferred material provided by the present invention is a copolyester of a polycarbonate based on 4:4-dihydroxy diphenyl-2:2-propane and polyethylene terephthalate or polyethylene isophthalate, these being derived from ethylene glycol and terephthalic or isophthalic acid, the polyester units constituting 1 to 90%, preferably 3 to 70%, of the weight of the copolyester.

It has been found that the copolyesters just defined substantially retain the advantages of the polycarbonates from which they are derived (which advantages are referred to above), and at the same time have an increased rigidity or improved moulding properties. The products are true copolyesters and not mere admixtures; this is illustrated by the fact that the product containing polyethylene terephthalate units dissolves in solvents in which polyethylene terephthalate is insoluble. Thus, for example, the copolyesters of a polycarbonate based on 4:4-dihydroxy diphenyl-2:2-propane and the aforesaid polyethylene terephthalate, the latter constituting up to 70% of the copolyester, are soluble in methylene chloride, whereas the low molecular weight polyethylene terephthalate is not.

The copolyesters may be prepared by any convenient method. In one preferred method a preformed polyester of relatively low molecular weight is present during the formation of the polycarbonate, and in another method the ingredients for the production of both the polycarbonate and the polyester may be brought together and polymerisation and co-polymerisation effected under controlled conditions. In yet another method a preformed polycarbonate and preformed polyester, both of low molecular weight, are copolymerised.

All these forms of the invention are illustrated in the examples which follow:

EXAMPLE 1

(a) Preparation of polyethylene terephthalate of low molecular weight 19.4 parts by weight (0.1 mole) of dimethyl terephthalate and 7.44 parts by weight (0.12 mole) of ethylene glycol are fused together with 0.01% by weight of litharge at 200° C. for 3 hours. The pressure is then reduced to less than 1 mm. Hg pressure and the temperature increased to 220° C. for a further 3 hours. The resulting polymer is white, insoluble in methylene chloride, has a melting point 200 to 220° C. and a molecular weight of approximately 2000.

(a) Preparation of copolyester 9.4 parts by weight of diphenyl carbonate, 9.12 parts by weight of 4:4-dihydroxy diphenyl-2:2-propane and 0.46 parts by weight of polyethylene terephthalate prepared as above, together with 0.01 parts by weight of lead oxide and 0.01 parts by weight of zinc oxide are brought into the molten state in an atmosphere of nitrogen. After one hour at 180° C. and 20 mm. Hg pressure the distillation of phenol is almost complete and the pressure is lowered to 10 mm. Hg for one hour at 220° C. and finally the mixture is heated to 290° C. for 3 hours at less than 1 mm. Hg pressure.

A viscous melt is obtained which solidifies to a substantially clear mass. This copolymer has a K value of 54 and a solution in methylene chloride casts to a clear tough film with improved rigidity.

EXAMPLE 2

The procedure of Example 1 is followed but using 1.82 parts by weight of low molecular weight polyethylene terephthalate as in the previous example. The product is hard and tough and soluble in methylene chloride.

EXAMPLE 3

9.7 parts by weight of dimethyl terephthalate and 5.0 parts by weight of ethylene glycol are fused together with 0.001 part by weight of lead oxide at 200° C. for 6 hours. 47.0 parts by weight diphenyl carbonate and 45.6 parts by weight of 4:4'-dihydroxy diphenyl-2:2-propane are added to the melt and the polymerisation continued as in Example 1 above. The copolymer is soluble in dioxan and methylene chloride and has a K value of 50.

EXAMPLE 4

20 parts by weight of a low molecular weight polycarbonate formed by interaction of 4:4'-dihydroxy diphenyl-2:2-propane and diphenyl carbonate in excess, are brought into a molten state with 4 parts of polyethylene terephthalate prepared as in Example 1 (a), together with 0.01 parts by weight of zinc oxide and 0.01 parts by weight of lead oxide in an atmosphere of nitrogen. After one hour at 220° C. and 10 mm. Hg pressure, the reaction was completed by heating for 3 hours at 280° C. and 1 mm. Hg pressure. The product is a tough, clear polymer with a K value of 55.

EXAMPLE 5

The procedure of Example 1 is followed, except that the dimethyl terephthalate is replaced by dimethyl isophthalate. A soluble copolymer with K=50 and capable of forming films or being moulded is obtained.

EXAMPLE 6

27.4 parts by weight of polyethylene terephthalate as prepared in Example 1 (a) are fused together with 45.6 parts by weight of 2.2-bis (4-hydroxyphenyl) propane and 47.0 parts by weight of diphenyl carbonate, and the copolymerisation effected as in Example 1. The product is soluble in methylene chloride.

The copolyesters of this invention are suitable for lacquers, injection moulding, or for the production of films by solution casting and melt casting.

When the copolyesters of the invention are used as injection moulding material they are found to have a substantially decreased melt viscosity for a given K value and temperature as compared with a polycarbonate of equal K value. Thus a copolyester derived from a polycarbonate based on 4:4'-dihydroxy diphenyl-2:2-propane and a polyester based on glycol and terephthalic acid, the polyester constituting 13% of the total copolyester, has a melt viscosity which may be half, or a third, or even less of the melt viscosity of the polycarbonate itself of the same K value, and results of comparable magnitude are obtainable even when the polyester units constitute only 4% of the total copolyester. Furthermore, the decrease in melt viscosity is accompanied by a useful drop in melting point of about 10 to 20° C., this facilitating the injection moulding process. These properties are illustrated in the accompanying table in which the polycarbonate and polyester are based on materials as indicated above:

|  | Content of polyester (terephthalate) units | | |
|---|---|---|---|
|  | 0% | 4% | 13% |
| K value | 50 | 50 | 50 |
| Melting point, °C | 220–230 | 200–207 | 198–203 |
| Apparent viscosity (poises) at 200° C | 108×10⁴ | 44×10⁴ | 45×10⁴ |
| Apparent viscosity (poises) at 250° C | 6×10⁴ | 2.2×10⁴ | 2.5×10⁴ |

Film produced by solution or melt casting is clear, tough and dimensionally stable and can be given increased rigidity and tensile strength by drawing in one or two directions. The copolyesters provide an excellent material for casting of film from solution in readily available solvents, such as methylene chloride. The normal advantages accruing to solution cast film are obtained such as freedom from included dirt specks (solutions can be filtered), high surface quality, clarity and transparency, and uniformity of gauge.

During the seasoning stage of film production in which the last traces of solvent are removed by heating at elevated temperatures, the lack of tendency to crystallise possessed by the copolyesters of this invention makes it possible to dry the film by heating at 90–100° C. without substantial loss of clarity.

The strength, transparency and lack of colour and low moisture absorption of cast film of the copolyesters of this invention make them suitable for high dimensional stability photographic film base. If the tensile properties are insufficient they can be improved by drawing in one or two dimensions.

When film formed of the copolyesters of this invention is to be used as photographic film base it is necessary to apply to it so-called subbing layers to ensure adequate adhesion between the base and the usual type of gelatino photographic emulsion. The following are convenient subbing processes:

A. Film formed of the copolyester of Example 1 was coated with the following solutions in succession:

(i)

| | |
|---|---|
| Butadiene/acrylonitrile copolymer 85:15 _____g__ | 2.5 |
| Methyl ethyl ketone _____ccs__ | 100 |

(ii)

| | |
|---|---|
| Collodion cotton HX 30–50, damped 30% spirit_g__ | 2 |
| Methanol _____ccs__ | 100 |

(iii)

| | |
|---|---|
| Gelatin _____g__ | 10 |
| Salicylic acid_____g__ | 1 |
| Water _____ccs__ | 50 |
| Ethyl alcohol (74° O.P. spirit)_____ccs__ | 650 |
| Ethyl acetate_____ccs__ | 300 |
| Collodion cotton HL 120–170, damped 30% spirit _____g__ | 2 |
| Formaldehyde 40% solution_____cc__ | 0.5 |

B. Film formed of the copolyester of Example 1 was coated with the following solutions in succession:

(i)

| | |
|---|---|
| Tripolymer as defined below_____g__ | 4 |
| Methyl ethyl ketone_____ccs__ | 80 |
| Dioxane _____ccs__ | 20 |

(ii)

| | |
|---|---|
| Collodion cotton HX 30–50, damped 30% spirit_g__ | 2 |
| Methanol _____ccs__ | 100 |

(iii)

| | |
|---|---|
| Gelatin _____g__ | 1 |
| Salicylic acid_____g__ | 0.1 |
| Distilled water_____ccs__ | 5 |
| Ethyl alcohol_____ccs__ | 80 |
| Ethyl acetate_____ccs__ | 15 |
| Collodion cotton HL 120–170, damped 30% spirit _____g__ | 0.2 |
| Formaldehyde 40% solution_____cc__ | 0.05 |

The tripolymer just referred to was prepared by the copolymerisation at 60° C. of:

| | |
|---|---|
| Vinylidene chloride_____ccs__ | 85 |
| Acrylonitrile _____ccs__ | 15 |
| Maleic anydride_____g__ | 2 |
| Benzene _____ccs__ | 90 |
| Azo-bis-isobutyronitrile _____g__ | 2 |

The reaction product is precipitated with ethyl alcohol, washed and dried at 80° C. in vacuo.

When the film thus subcoated was coated with a standard X-ray sensitive photographic gelatino silver halide emulsion, the emulsion remained firmly adherent during development, fixing and washing.

The copolyesters of this invention may also be used to advantage to form film serving as base for recording tape, for which purpose such film, especially after unidirectional drawing for orientation, has high dimensional stability and tensile strength, and a lower elongation at break.

What we claim is:

1. Linear copolycondensation product comprising recurring aromatic carbonate units and carboxylic acid ester units in the polymer chain, the carbonate units being the products of condensing a (dimonohydroxy-aryl)-alkane of the formula:

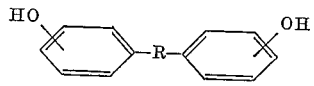

in which R is an alkane radical selected from the group consisting of methane, ethane, propane, butane and cyclohexane radicals, with a compound selected from the group consisting of phosgene, dialkyl carbonates, diaryl carbonates and bis-chlorocarbonic alkyl esters of alkanes of the above formula, and the carboxylic acid ester units being the products of condensing glycols containing 2 to 10 carbon atoms with a dibasic acid selected from the group consisting of terephthalic acid and isophthalic acid, the ester units constituting 3 to 70% by weight of the copolyester.

2. Shaped article formed of a copolyester as defined in claim 1.

3. Injection moulded article formed of a copolyester as defined in claim 2.

4. Film formed of a copolyester as defined in claim 2.

5. A copolyester which comprises recurring aromatic carbonate units and carboxylic acid ester units in the polymer chain, the carbonate units being the products of condensing 4:4'-dihydroxy diphenyl-2:2-propane and diphenyl carbonate and the carboxylic acid ester units being the products of condensing ethylene glycol and terephthalic acid, the polyester units constituting 3 to 70% by weight of the copolyester.

References Cited in the file of this patent

UNITED STATES PATENTS 2,789,971    Reynolds et al. _____ Apr. 23, 1957

OTHER REFERENCES

Bjorksten et al.: "Polyesters and Their Applications," pub. 1956 by Reinhold Pub. Co., page 224.